L. L. LAKATOS

APPARATUS FOR MONITORING SIGNAL LEVELS
IN A DIVERSITY RECEIVING SYSTEM

Filed Nov. 30, 1955

INVENTOR.
LOUIS L. LAKATOS
BY
Edward W Hughes
ATTORNEYS

United States Patent Office 2,927,202

Patented Mar. 1, 1960

2,927,202

APPARATUS FOR MONITORING SIGNAL LEVELS IN A DIVERSITY RECEIVING SYSTEM

Louis L. Lakatos, Philadelphia, Pa., assignor, by mesne assignments, to the United States of America as represented by the Secretary of the Navy

Application November 30, 1955, Serial No. 550,228

1 Claim. (Cl. 250—20)

This invention relates to diversity receiving systems, and in particular to apparatus for monitoring the signal levels in two channels of such a system.

This invention is particularly applicable to receiver diversity systems which use a common limiter. In this type of diversity system, signals are obtained from two receiving channels of the superheterodyne type with the intermediate frequency output signal of one channel being offset slightly from the intermediate frequency output of the other channel. The two output signals are applied to a common limiter which suppresses the weaker signal. For the diversity system to operate most effectively, the signal levels at the combining point must be equal in the absence of fading, assuming equal noise levels in the two channels. This latter condition is usually met by providing equally effective antenna systems for the two channels and receivers having substantially identical performance characteristics. The condition for most effective operation is then met by adjusting the gains of the two receivers to produce signals of equal amplitudes at the combining point.

Under conditions of fading, the adjustments necessary to provide equal gains are very difficult, especially in the case of frequency shift telegraphy, where each channel may be subjected to selective fading between the mark and space frequencies. Inasmuch as the diversity effect depends upon dissimilar fading characteristics of the two channels, the more effective the diversity action, the more difficult it becomes to equalize the gains of the two channels, and this difficulty increases with the severity of the fading, at which time the need for good diversity action by the system is at a maximum.

Heretofore, it has been the practice to monitor each channel of the diversity system separately by electronic meters. This made it necessary for the operator to observe two indicators simultaneously. Further disadvantages resulting from using electronic meters are that the meters must be calibrated if accurate results are to be obtained, and the calibration must be continuously rechecked.

It is, therefore, an objective of this invention to provide improved apparatus for monitoring the signal levels in a diversity receiving system.

It is a further objective of this invention to provide improved apparatus for monitoring the signal levels in a diversity receiving system which does not need to be calibrated.

It is a still further objective of this invention to provide improved apparatus for monitoring the signal levels in a diversity receiving system in which equality of signal levels is indicated positively by a single instrument that needs no calibration.

Other objects and many of the attendant advantages of this invention will be readily appreciated as the same becomes better understood by reference to the following detailed description when considered in connection with the accompanying drawings wherein.

Figure 1:
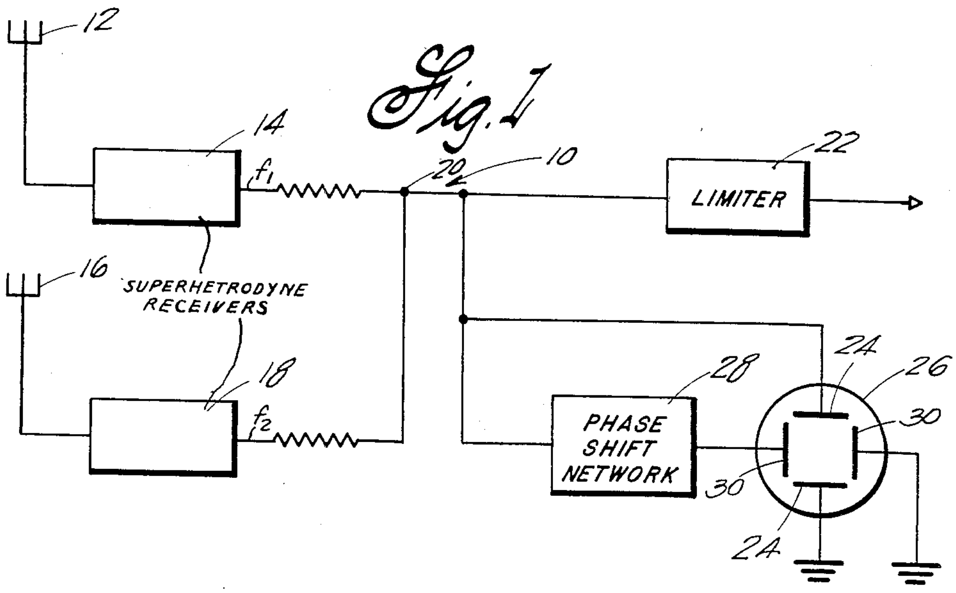
Fig. 1 is a block diagram of the invention.

In Fig. 1 the components of a diversity receiver, system 10, with which the invention is used are illustrated. Antenna 12 and superheterodyne receiver 14 form one channel, and antenna 16 and superheterodyne receiver 18 form a second channel. The I.F. output signals of the two channels are applied to combining point 20. Limiter 22 is connected to combining point 20 and acts to suppress the signal of lesser amplitude from receivers 14 and 18 and passes the signal of greater amplitude to the remaining components of the diversity receiving system, which are not illustrated.

The signals at the combining point 20 are connected directly to the vertical deflecting electrodes 24, for example, of cathode ray tube 26, which is illustrated schematically. Cathode ray tube 26 is a component of a conventional oscilloscope which is not illustrated. The signals at the combining point 20 are also connected to phase shift network 28, and after being shifted approximately 90° are then applied to the horizontal deflecting electrodes 30 of cathode ray tube 26.

Figure 2:
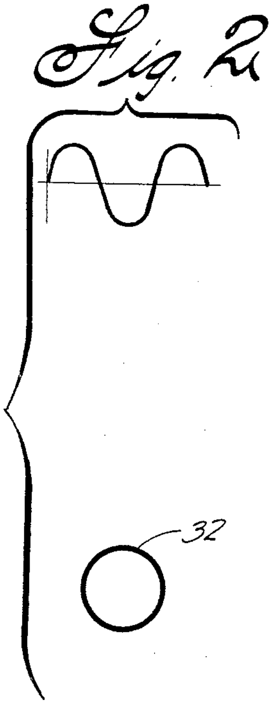
Fig. 2 illustrates the type of trace produced on an oscilloscope when only one signal is present.

Referring now to Fig. 2, when a signal is present at point 20 from only one channel, the trace 32 on the face of cathode ray tube 26 of the oscilloscope will be that of a circle if the vertical and horizontal deflections are equalized.

As the signal from the second channel is increased from zero, the amplitude of the envelope of the combined signals at the combining point 20 will fluctuate at the difference frequency rate. The radius of the trace on the face of cathode ray tube 26 of the oscilloscope will also fluctuate at the difference frequency rate. The trace then becomes a spiral, the radius of which increases when the envelope amplitude increases, and which decreases when the envelope amplitude decreases. In a practical case, the frequency of the output signal of one channel may be 10 kilocycles and the difference between the two output signals is of the order of 100 cycles, so that approximately 100 loops of the spiral are traced out for one complete beat frequency cycle. Since the radius returns to its starting amplitude in each of such cycles, the trace will consist of one spiral having 50 loops starting at the minimum amplitude and expanding to the maximum amplitude, with a second spiral starting at the maximum and returning to the minimum, and having the same number of loops.

Figure 3:
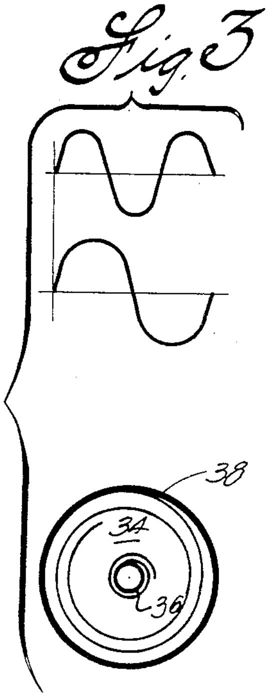
Fig. 3 illustrates the type of trace produced on an oscilloscope when two signals of different amplitudes and frequencies are present.

In Fig. 3 the two wave forms which are combined at point 20 are illustrated with the amplitude of one being smaller than the other, the difference in frequency between the two signals has been greatly exaggerated in order to facilitate illustration. The trace which the signals will produce consists of an illuminated ring 34, with a bright inner boundary 36 and a bright outer boundary 38. This is due to the approximate sinusoidal shape of the envelope, for large percentage modulation, and the consequently reduced spot velocity at the inner and outer boundaries. Spirals from the bright inner boundary 36 are moving outwardly and spirals from the bright outer boundary 38 are moving inwardly, in accordance with the change in frequency rate with both spirals moving in the same direction but towards or away from each other. It is to be understood that the spirals, of Fig. 3, are shown discontinuous merely for facility of illustration.

Figure 4:
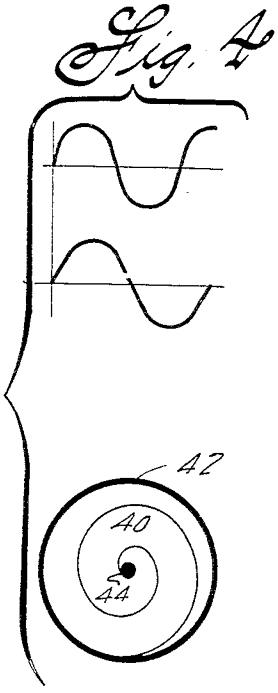
Fig. 4 illustrates the type of trace produced on an oscilloscope when the amplitudes of the two signals are equal, but the frequencies are unequal.

In Fig. 4 the amplitudes of the two signals from receivers 14, 18 are illustrated as being equal. When this is the case, the maximum radius of the spiral is double the value it would have if only one signal were present, and the minimum radius is zero. This produces the trace of Fig. 4 which consists of an illuminated circular disk 40 with a bright outer boundary 42 and a bright spot 44 in the center.

The indication of equality of amplitude between the signals from receivers 14, and 18; namely, the complete cancellation of the minima of the envelope, is positive and precise. The degree of precision is limited only by the size of the screen of the cathode ray tube of the oscilloscope. It is obvious from the foregoing that no calibration of the oscilloscope is required.

It is not essential in the operation of the invention that the amount of phase shift produced by network 28 be precisely 90°, and that the horizontal and vertical deflections of the oscilloscope be equal. The amount of phase shift and the inequality between the horizontal and vertical deflections may vary over wide limits. Such variations cause the patterns to become elliptical instead of circular, but the patterns retain all their essential characteristics to permit them to be used to determine when the signals applied to the combining point are equal in amplitude.

Obviously many modifications and variations of the present invention are possible in the light of the above teachings. It is therefore to be understood that within the scope of the appended claim the invention may be practiced otherwise than as specifically described.

What is claimed is:

In a diversity receiving system having a first antenna and a first super heterodyne receiver for producing a first output signal having an intermediate frequency, a second antenna and a second super heterodyne receiver for producing a second output signal having a lesser intermediate frequency than the first signal and wherein the signals are combined and combined signals are applied to a common limiter to suppress the signal of lesser amplitude and to pass the signal having a stronger amplitude, the improvement which comprises a cathode ray oscillograph for indicating the relative amplitude of said signals and having vertical and horizontal deflecting electrodes, a first circuit connecting the combined signals to the vertical deflecting electrodes, a second circuit connecting the combined signals to the horizontal deflecting electrodes and a phase shifting network in the second circuit whereby equality of amplitude between the output signals is directly indicated by a bright outer boundary and a bright center spot on the oscilloscope.

References Cited in the file of this patent

UNITED STATES PATENTS

| | | |
|---|---|---|
| 1,604,610 | Schelleng | Oct. 26, 1926 |
| 2,130,485 | Feldman et al. | Sept. 20, 1938 |